United States Patent
Ishii et al.

[11] 3,805,746
[45] Apr. 23, 1974

[54] ROTARY INTERNAL COMBUSTION ENGINE

[75] Inventors: Hideto Ishii; Hideki Konishi, both of Tokyo, Japan

[73] Assignee: Nissan Motor Company, Limited, Kanagawa-ku, Yokohama City, Japan

[22] Filed: Feb. 20, 1973

[21] Appl. No.: 333,524

[30] Foreign Application Priority Data
Feb. 21, 1972 Japan.............................. 47-17931

[52] U.S. Cl............................ 123/8.13, 123/119 A
[51] Int. Cl................................................ F02b 53/02
[58] Field of Search ....... 123/8.01, 8.13, 8.07, 8.45, 123/119 A

[56] References Cited
UNITED STATES PATENTS
3,646,764  3/1972  Nakajima et al............ 123/119 A X
3,682,151  8/1972  Tatsutomi...................... 123/119 A Primary Examiner—Carlton R. Croyle
Assistant Examiner—Michael Koczo, Jr.

[57] ABSTRACT

A technique for preventing irregular running of rotary internal combustion engines having more than one rotary engine unit when braking during deceleration. The technique involves providing a passageway leading from an outlet channel of one rotary engine unit to an inlet channel of another rotary engine unit and a valve for opening the passageway when the engine is braking during deceleration and closing the same during the remaining operations. Exhaust gas discharged from one rotary engine unit due to the pressure difference across the passageway flows through the passageway to reach the inlet channel of the other rotary engine unit, weakening the fresh gas if the exhaust gas is burned or strengthening the fresh gas if the exhaust gas is unburned. The passageway is arranged and sized so that with respect to one crankshaft revolution there occurs a misfire in one rotary engine unit and a fire in the other rotary engine unit, or vice versa.

9 Claims, 5 Drawing Figures

ROTARY INTERNAL COMBUSTION ENGINE

The present invention relates to a rotary internal combustion engine, and more particularly to a method and apparatus for preventing irregular running in such engine, when braking during deceleration.

The rotary internal combustion engines of the type described herein generally comprise a housing having a plurality of chambers, each formed by two axially spaced end walls interconnected by a shell having an epitrochoidal peripheral inner wall, each chamber having a rotor provided with apices and arranged to sealingly and slidably rotate therein. A crankshaft extending axially through the chambers has an eccentric portion in each chamber on which the corresponding rotor is mounted. Each chamber is further provided with an intake port, an exhaust port and ignition means. The apices form between themselves and the corresponding inner and end walls three working chambers each rotating about the crankshaft once per three crankshaft revolutions, thus completing a cycle consisting of intake, compression, expansion and exhaust phases. Air supply means and fuel supply means are provided for supplying explosive or combustible gas mixture to the intake ports.

For the purpose of supplying the combustible gas mixture and exhausting burned gases, there are provided in the housing an inlet channel and an outlet channel for each chamber, the ports of which are swept by the rotating rotor. Known in the art, regardless of the sizes of the ports, it is not possible to avoid some overlapping of the intake and exhaust phases in each working chamber at the overlap dead-center. This partial overlap has little significance when the engine is operating under heavy load, but when operating while the engine is braking during deceleration or the engine is idling, the result is that, in the respective working chamber at the overlap dead center, some exhaust gas in the trailing portion of a working chamber which is in the exhaust phase is overflown to the leading portion of the same working chamber which is in the intake phase due to the relatively great pressure difference therebetween, reducing the amount of the fresh combustible gas mixture which may be drawn in. More specifically, the thus overflown exhaust gas mixes with the fresh combustible gas mixture, rendering the latter non-ignitable, if the former is burned exhaust gas, and rendering the latter ignitable, if the former is unburned exhaust gas. Accordingly, with respect to each working chamber, "misfire" and "fire" will occur alternately.

It is known that three consecutive fires and three consecutive misfires are liable to occur alternately, with respect to each rotor or each rotary engine unit, when the engine is braking during deceleration, in case the number of working chambers formed by one rotor is three, causing torque irregularity or irregular running which induces mechanical vibration of the engine. When the engine is braking during deceleration the engine vibration tends to be resonant with an inherent vibration of the vehicle body mounting the engine, causing an excessive rocking of the vehicle body. This phenomenon will be hereinafter referred to as "car bucking", since the vehicle occupants have the feeling of being pushed back and forth in this condition.

It is an object of the present invention to provide a method of preventing the irregular running of a rotary internal combustion engine having more than one rotors or rotary engine units.

Another object of the present invention is to provide a rotary internal combustion engine in which by simple means the irregular running occurring when the engine is braking during deceleration is eliminated.

According to one aspect of the present invention there is provided a method of preventing irregular running of a rotary internal combustion engine occurring when the engine is braking during deceleration, which rotary internal combustion engine includes a plurality of chambers each having an intake port and an exhaust port and formed by axially spaced end walls interconnected by a shell having an epitrochoidal peripheral inner wall; a crankshaft extending coaxially through said chambers and having a plurality of eccentric portions, one for each of said chambers; a plurality of rotors each mounted on one of said eccentric portions for planetary rotation within the corresponding chamber, each of said rotors sealingly and slidably engaging the corresponding peripheral and end walls to form a plurality of working chambers between said rotor and said peripheral and end walls, each of said working chambers formed with one of said rotors varying in volume and completing a cycle of intake, compression, expansion, and exhaust phases; the method comprising: a first step of reserving a portion of the exhaust gas discharged from an exhaust port of one chamber for the period corresponding to a predetermined crankshaft rotation angle; and then a second step of feeding the portion of the exhaust gas into an intake port of another chamber.

According to another aspect of the present invention there is provided a rotary internal combustion engine comprising: a plurality of chambers each having an intake port and an exhaust port and formed by axially spaced end walls interconnected by a shell having an epitrochoidal peripheral inner wall; a crankshaft extending coaxially through said chambers and having a plurality of eccentric portions, one for each of said chambers; a plurality of rotors each mounted on one of the eccentric portions for planetary rotation within the corresponding chamber, each of said rotors sealingly and slidably engaging the corresponding peripheral and end walls to form a plurality of working chambers between said rotor and said peripheral and end walls, each working chamber corresponding to one of said rotors varying in volume and completing a cycle of intake, compression, expansion and exhaust phases; at least one passageway connecting an exhaust port of one chamber with an intake port of another chamber; and a valve for closing said passageway and for opening the same when the engine is braking during deceleration.

Other objects, features and advantages of the present invention will become more apparent from the following description with reference to the accompanying drawings, in which.

The present invention will be described as applied to a dual-rotor rotary internal combustion engine, but will not be limited to this application. It will be readily understood that the present invention can be applied also to rotary internal combustion engines having more than two rotors.

Figure 1:
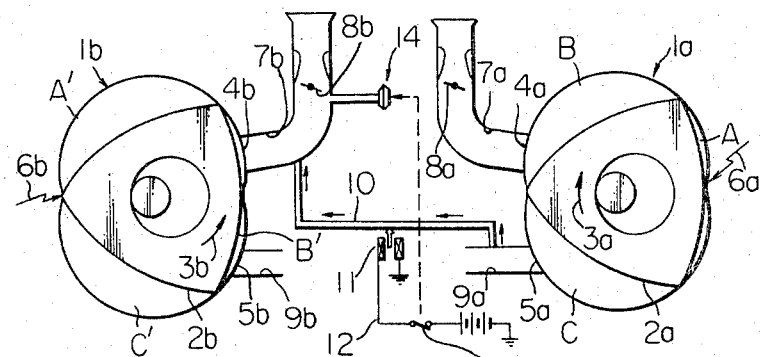
FIG. 1 is a diagrammatic schematic view of a first preferred embodiment of the present invention.
Figure 2:
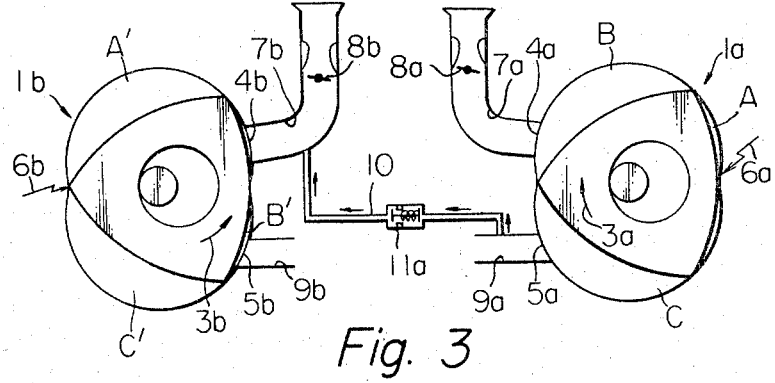
FIG. 2 is a diagrammatic schematic view of a second preferred embodiment of the present invention.
Figure 3:
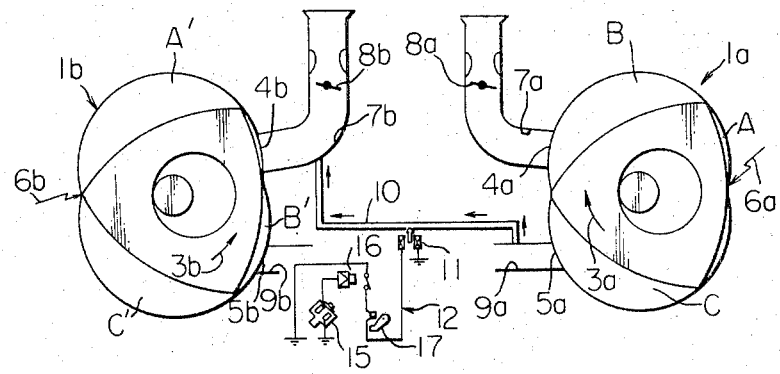
FIG. 3 is a diagrammatic schematic view of a third preferred embodiment of the present invention.

Referring first to FIGS. 1 to 3 of the drawings, there is shown a dual-rotor rotary internal combustion engine consisting of two similar rotary engine units. Both rotary engine units are shown in transverse section. For clarity of illustration, however, the two rotary engine units are shown sandwich opened in opposite direction of view instead of, as in the actual dual-rotor rotary internal combustion engine, one behind the other.

Referring especially to FIG. 1, reference numerals $1a$ and $1b$ designate first and second chambers within which rotors $2a$ and $2b$ rotate in the direction of the arrows $3a$ and $3b$, respectively. A crankshaft (no numeral) extends co-axially through the chambers $1a$ and $1b$. The rotors $2a$ and $2b$ are mounted on the associated eccentric portions (no numeral) for planetary rotation within the corresponding chambers $1a$ and $1b$. The two eccentric portions are annularly offset from each other by 180°. A, B and C designate working chambers formed by the rotor and the peripheral and end walls of the chamber $1a$, each rotating about the crankshaft once per three crankshaft revolutions, completing a cycle of intake, compression, expansion and exhaust phases. Alphabets A', B' and C' designate working chambers formed by the rotor $2b$ and the peripheral and end walls of the chamber $1b$. Reference numerals $4a$ and $5a$ designate an intake port and an exhaust port of the chamber $1a$, and reference numerals $4b$ and $5b$ an intake port and an exhaust port of the chamber $1b$, respectively. Only schematically indicated ignition sources $6a$ and $6b$ as well as inlet channels $7a$ and $7b$ with throttle valves $8a$ and $8b$ and outlet channels $9a$ and $9b$ are arranged in the casing forming the chambers $1a$ and $1b$.

According to the present invention, the two chambers $1a$ and $1b$ communicate with each other by a passageway 10, and more particularly the passageway 10 leads to the inlet channel $7b$ from the outlet channel $9a$.

For the purpose of normally blocking the passageway 10 but opening the same when the engine is braking during deceleration, means is provided comprising an electrically operable valve 11, such as a solenoid valve, an electric circuit 12 including therein a switch 13 which is operatively connected to a diaphragm unit 14. The diaphragm unit 14 has a suction chamber (no numeral) communicating with the inlet channel $7b$ through a conduit (no numeral). The diaphragm unit 14 and the switch 13 are so operatively connected that the former closes the latter when a suction in the inlet channel $7b$ is above a predetermined level, which level is higher than that at idling of the engine.

Figure 4A:
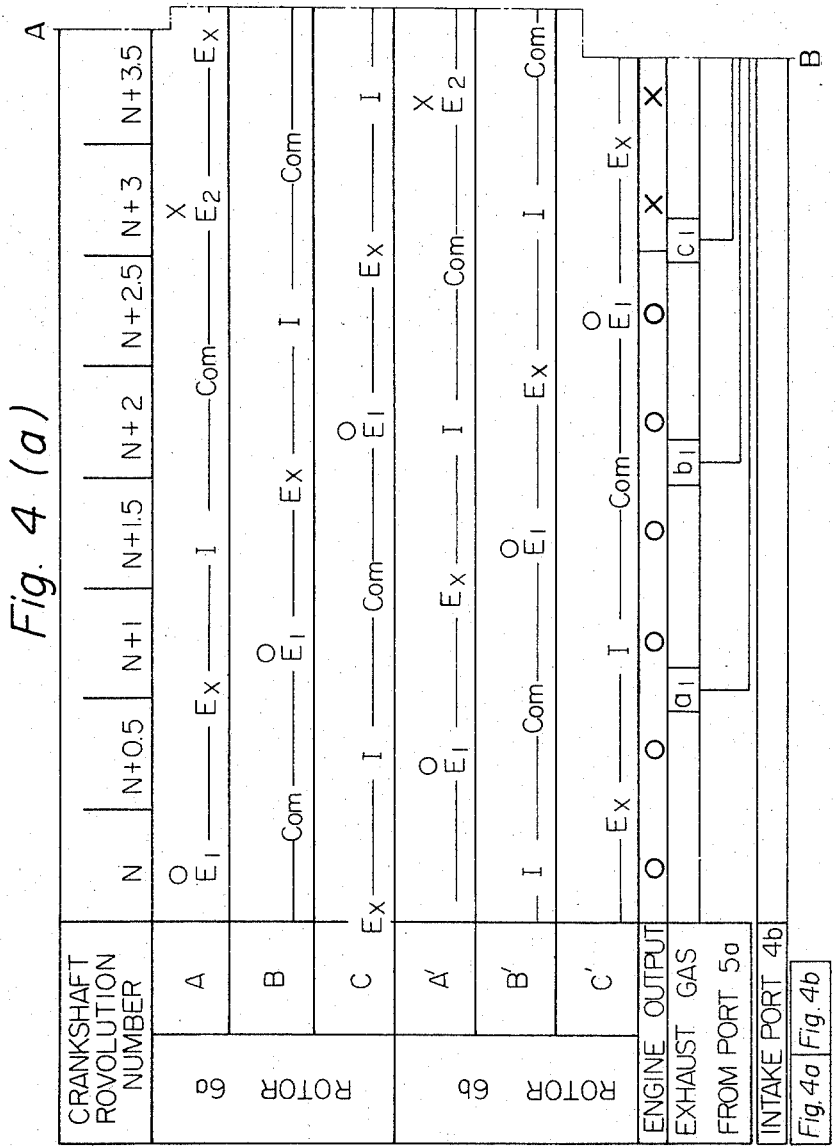
FIGS. 4(a) and 4(b) are a Table showing "sequence" schedule of the present invention.
Figure 4B:
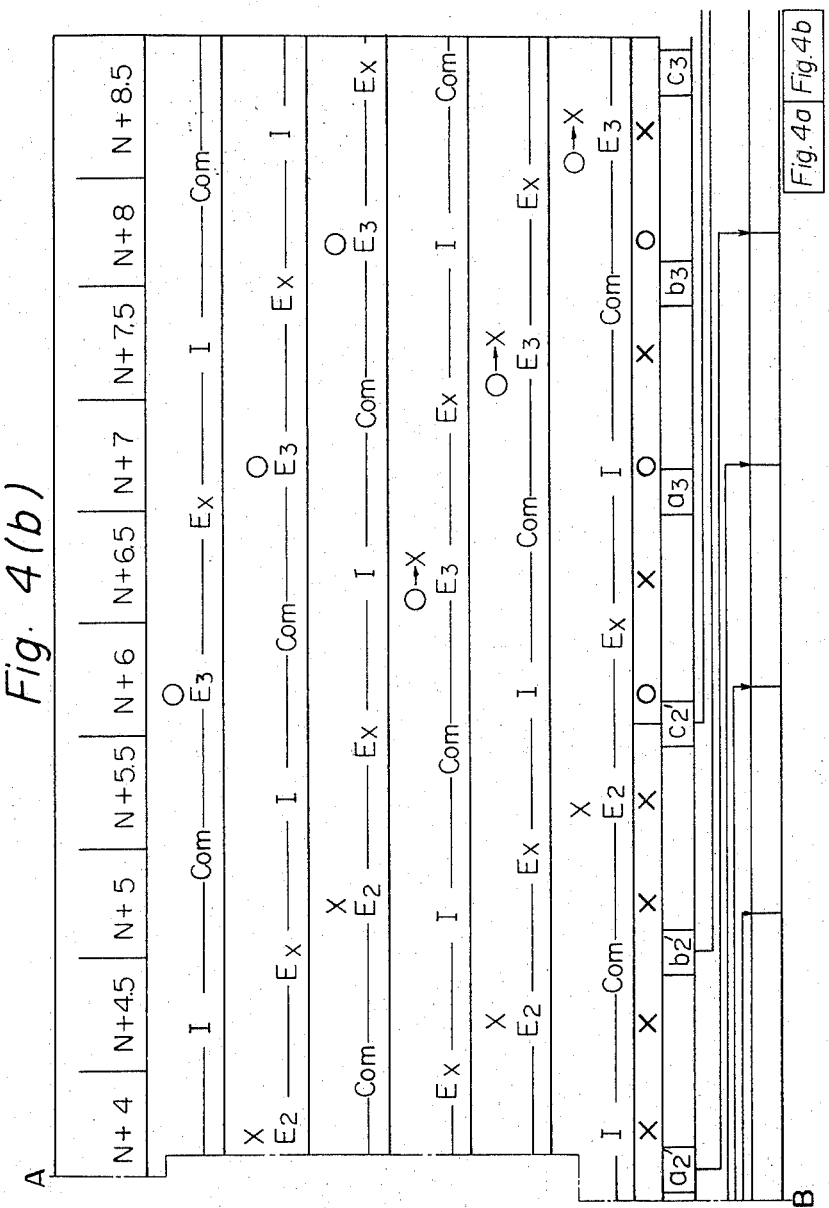

The operation of the above described embodiment will be readily understood when referring to the FIG. 4 of the drawings.

Referring now to FIG. 4, there is shown a Table of the schedule of the four phases of each of the working chambers A, B, C, A', B' and C' taking place as the crankshaft revolves when the engine is braking during deceleration, and the way a portion of the exhausted burned or unburned exhaust gas of each of the working chambers A, B and C is fed to each of corresponding working chambers A', B' and C'. In the Table shown in FIG. 4, symbols "E", "Ex", "I" and "Com" represent expansion, exhaust, intake, and compression phases, respectively. Symbols $o$ and $x$ represent "fire" and "misfire", respectively. Alphabets $a$, $b$ and $c$ represent burned exhaust gases emitted from the working chambers A, B and C, respectively, a suffix added to the alphabet $a$, $b$ or $c$ designates the order of a cycle during which every working chamber completes the four phases once. A dash or prime added to the alphabet $a$, $b$ or $c$, viz. $a'$, $b'$ or $c'$ represents unburned exhaust gases emitted from the working chambers A', B' and C', respectively.

In the Table, the burned exhaust gas $a_1$ is fed to the working chamber A' during an intake phase just preceding an expansion phase occurring thirdly, diluting or weakening the combustible charge in the working chamber A'. The thus diluted combustible charge will misfire during this expansion phase because the explosive charge to be introduced into the working chamber A' during the intake phase preceding the said expansion phase mixes with the burned exhaust gas $a_1$. Similarly, for the purpose of inducing misfires in the corresponding working chambers B' and C' burned exhaust gases $b_1$ and $c_1$ are fed to the intake port $5a$ after the crankshaft revolves a predetermined crankshaft angle.

In the same manner unburned exhaust gases $a_2'$, $b_2'$ and $c_2'$ are fed to the intake port $5a$ after the crankshaft revolves the predetermined crankshaft angle in order to assure that the corresponding working chambers A', B' and C' fire.

As a result of the method described above the torque irregularity of the dual rotor rotary engine having the two rotary engine units is rendered irregular once per one crankshaft revolution.

In other words with respect to one crankshaft revolution, there occurs a fire in one rotary engine unit and a misfire in the other rotary engine unit, or vice versa. Consequently fire and misfire will occur alternately.

It will be appreciated that since fire and misfire occur alternately according to the present invention, the frequency of the vibration of the engine will not become resonant with the inherent vibration of the vehicle body.

More specific discussion of the present invention will follow hereinafter. As will be understood from the Table in FIGS. 4(a) and 4(b), the burned exhaust gases $a_1$, $b_1$ and $c_1$ emitted during the expansion phases designated by $E_1$ of the working chambers A, B and C and discharged during their succeeding exhaust phases, respectively are fed to the corresponding working chambers A', B' and C' to induce misignitions of the combustible gas mixtures in the working chambers A', B' and C' during the expansion phases designated by $E_3$ thereof. Feeding of the burned exhaust gases $a_1$, $b_1$, $c_1$ to the corresponding working chambers A', B' and C' should preferably occur coincidentally with the beginning stages of the intake phases right preceding the expansion phases $E_3$ thereof, respectively. The period between the beginning of the exhaust phase just succeeding the expansion phase $E_1$ of the working chamber A and the beginning of the intake phase just preceding the expansion phase $E_3$ of the corresponding working chamber A' can be expressed in terms of the crankshaft revolution angle. The predetermined crankshaft angle R is given by the following equation;

$$R = 360° \times 3 \times 2 + 180° - \theta \qquad 1.$$

where $\theta$: an angle in degrees between a crankshaft position when an intake phase of a working chamber begins and an advanced crankshaft position when an exhaust phase succeeding the intake phase of the working chamber begins.

It is to be noted in the above equation that one crankshaft revolution angle 360° is multiplied by 3 to provide a crankshaft position when the next succeeding exhaust phase, viz. in the second cycle, begins in a working chamber of rotor 6a, and further multiplied by 2 to provide a further advanced crankshaft position when the thirdly occurring succeeding exhaust phase, viz. in the third cycle, in the same working chamber begins, and added by 180° to provide a crankshaft position when an exhaust phase of the corresponding working chamber of rotor 6b begins, and lastly subtracted by $\theta$ to provide a crankshaft position when an intake phase in the correspondong working chamber of rotor 6b begins. It will be noted that the number three (3) represents the number of working chambers corresponding to one chamber or one rotor.

From the foregoing description referring to the FIG. 4, it will be understood that selecting the period as determined by the equation (1) causes the torque to be irregular once per one crankshaft revolution. However, it is to be noted that the same result can be obtained by selecting other periods as will be described hereinafter.

The equation (1) can be readily expressed in a general form so that the preferred predetermined crankshaft angle can be determined when the method of the present invention is applied to rotary internal combustion engines having more than two rotors. The general form of the equation (1) can be expressed as follows;

$$R = 360° \times 3 \times n + A - \theta \qquad 2.$$

where,
  $n$: a positive even number corresponding to the number of rotors, and
  $A$: an angularly offset angle in degrees between a rotor within a chamber from which exhaust gases are discharged and another rotor within another chamber to which the exhaust gases are fed.

Reverting to FIG. 1 of the drawing, the operation of the preferred embodiment shown herein will now be described. When the suction in the inlet channel 7b at a portion adjacent and downstream of the throttle valve 8b exceeds a predetermined level, as will occur when the engine is braking during deceleration, the diaphragm unit 14 closes the switch 13, closing the circuit 12, thereby urging the valve 11 to its open position. The predetermined suction level should preferably be set higher than a suction level prevailing in the channel 7b when the engine is idling in order to prevent the circuit to be energized when the engine is idling, because "car bucking" will not occur when the engine is idling. When accordingly the passageway 10 is opened, portions of the exhaust gases are drawn into the passageway 10 due to the pressure difference across the passageway 10. The thus trapped exhausted gases will travel within the passageway 10 in the direction of the arrows (not numbered), reaching the outlet port of the passageway 10, mixing with the fresh explosive charge to be introduced to the intake port 4b. Since it is necessary to feed the exhaust gases $a_1, b_1, c_1, a'_2, b'_2, c'_2, a_3, b_3, c_3, \ldots$ in this subsequent order to the intake port 4b after the crankshaft revolves the predetermined crankshaft angle, as discussed before, the passageway should have such a gas flow resistance that a portion of the exhaust such as $a_1$ gas from the exhaust port 5a of the chamber 1a reaches the intake port 4b of the chamber 1b after the crankshaft revolves the predetermined crankshaft angle from a crankshaft position when the portion of the exhaust gas is discharged from the exhaust port 5a.

Referring to FIG. 2, there is shown another embodiment of the present invention. This embodiment is different from that shown in FIG. 1 in that a one way check valve 11a which is responsive to the suction prevailing in the inlet channel 7b is provided within the passageway 10 instead of the electrically operable valve 11 in FIG. 1. The one way check valve normally closes the passageway and opens the same when the suction level in the inlet channel 7b at a portion downstream of the throttle valve 8b exceeds the predetermined suction level. The operation of this embodiment is quite the same as that of FIG. 1 and will be readily understood without further description.

Since it has been found that "car bucking" is liable to take place when the engine used for illustration is running at speeds falling within the range of 1,200 to 1,500 rpm during deceleration provided that the idling speed is 900 rpm, it is desired, for the particular purpose of prevention of "car bucking", that the passageway 10 is opened when the engine is braking during deceleration and the engine speed is within the particular range. For this, another embodiment according to the present invention is illustrated in FIG. 3.

Referring to FIG. 3, there is shown still another embodiment of the present invention. This embodiment is different from that shown in FIG. 1 in that two in series connected switches, viz., one operatively connected with a crankshaft speed sensor 16 and a deceleration sensor 17 which senses deceleration condition in terms of accelerator pedal depression degree, respectively, are provided in the circuit 12, instead of the switch 13 in FIG. 2. The reference numeral 15 designates a speed sensor which generates a d.c voltage representing the r.p.m. The speed sensor closes its switch when the crankshaft speed is below a predetermined level. The acceleration sensor closes its switch when an accelerator pedal is released and returned to its initial released position.

The operation of this embodiment is, similar to that of FIG. 1, thus the detailed description is omitted for the sake of simplicity.

Although the present invention has been described mainly as applied to dual-rotor rotary internal combustion engines, it should be understood that the present invention can be applied also to rotary internal combustion engines having more than two rotors, and it will be also understood that various changes and modifications may be made by those skilled in the art without departing from the scope of the present invention, which is limited only by the appended claims.

What is claimed is:

1. A method of preventing irregular running of a rotary internal combustion engine occurring when the engine is braking during deceleration, which rotary internal combustion engine includes a plurality of chambers each having an intake port and an exhaust port and formed by axially spaced end walls interconnected by a shell having an epitrochoidal peripheral inner wall; a crankshaft extending coaxially through said chambers and having a plurality of eccentric portions, one for each of said chambers; a plurality of rotors each mounted on one of said eccentric portions for planetary rotation within the corresponding chamber, each of said rotors sealingly and slidably engaging the corresponding peripheral and end walls to form three working chambers between said rotor and said peripheral and end walls, each of said working chambers formed with one of said rotors varying in volume and completing a cycle of intake, compression, expansion, and exhaust phases; the method comprising; a first step of reserving a portion of the exhaust gas discharged from an exhaust port of one chamber during a predetermined crankshaft rotation angle; and then a second step of feeding the portion of the exhaust gas into an intake port of another chamber.

2. A method as claimed in claim 1, wherein said predetermined crankshaft rotation angle R is derived from an equation as follows;

$R = 360° \times 3 \times n + A - \theta$ where $n$: a positive even number corresponding to the number of rotors, $\theta$: an angle in degrees between a crankshaft position when an intake phase of a working chamber begins and an advanced crankshaft position when an exhaust phase succeeding the intake phase of the working chamber begins, $A$: an offset angle in degrees between a rotor within a chamber from which exhaust gases are discharged and another rotor within another chamber to which the exhaust gases are fed.

3. A rotary internal combustion engine comprising: a plurality of chambers each having an intake port and an exhaust port and formed by axially spaced end walls interconnected by a shell having an epitrochoidal peripheral inner wall; a crankshaft extending coaxially through said chambers and having a plurality of eccentric portions, one for each of said chambers; a plurality of rotors each mounted on one of the eccentric portions for planetary rotation within the corresponding chamber, each of said rotors sealingly and slidably engaging the corresponding peripheral and end walls to form three working chambers between said rotor and said peripheral and end walls, each working chamber corresponding to one of said rotors varying in volume and completing a cycle of intake, compression, expansion and exhaust phases; at least one passageway connecting an exhaust port of one chamber with an intake port of another chamber; and means for closing said passageway and for opening the same when the engine is braking during deceleration.

4. A rotary internal combustion engine as claimed in claim 3, wherein said passageway provides a gas flow resistance so that a portion of exhaust gas discharged from said exhaust port of said one chamber reaches said intake port of said another chamber through said passageway during a period corresponding to the time taken of the crankshaft to rotate a predetermined angle.

5. A rotary internal combustion engine as claimed in claim 4, wherein said predetermined crankshaft rotation angle R is derived from an equation as follows;

$R = 360° \times 3 \times n + A - \theta$ where $n$: a positive even number corresponding to the number of rotors, $\theta$: an angle in degrees between a crankshaft position when an intake phase of a working chamber begins and an advanced crankshaft position when an exhaust phase succeeding the intake phase of the working chamber begins, and $A$: an offset angle in degrees between a rotor within a chamber from which exhaust gases are discharged and another rotor within another chamber to which the exhaust gases are fed.

6. A rotary internal combustion engine as claimed in claim 3, wherein said means comprises an electrically operable valve for closing and opening said passageway, an electric circuit for actuating said electrically operable valve to open said passageway when said circuit is closed, and sensor for closing said circuit when said engine is braking during deceleration.

7. A rotary internal combustion engine as claimed in claim 6, wherein said sensor comprises a diaphragm switch having a suction chamber communicating with an inlet channel leading to said inlet port of said another chamber, interposed in said circuit, said diaphragm switch being closed when a suction in said inlet channel is above a predetermined level.

8. A rotary internal combustion engine as claimed in claim 6, wherein said sensor comprises a speed sensor switch interposed in said circuit said speed sensor switch being closed when the revolution speed of said crankshaft is above a predetermined level; and an acceleration degree sensor switch interposed in said circuit in series with, said acceleration degree sensor switch being closed when the accelerating degree is below a predetermined level.

9. A rotary internal combustion engine as claimed in claim 5, wherein said means comprises a one-way check valve interposed in said passageway which opens said passageway when suction in an inlet channel leading to said inlet port of said one chamber is above a predetermined level.

* * * * *